United States Patent
Laffra et al.

(10) Patent No.: US 7,860,927 B2
(45) Date of Patent: Dec. 28, 2010

(54) INSPECTING WEB BROWSER STATE INFORMATION FROM A SYNCHRONOUSLY-INVOKED SERVICE

(75) Inventors: Johannes C. Laffra, Raleigh, NC (US); Brian William Svihovec, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 12/180,126

(22) Filed: Jul. 25, 2008

(65) Prior Publication Data

US 2010/0023644 A1    Jan. 28, 2010

(51) Int. Cl.
*G06F 15/173*    (2006.01)
(52) U.S. Cl. ..................................... 709/203
(58) Field of Classification Search .................. 709/203
See application file for complete search history.

(56) References Cited

U.S. PATENT DOCUMENTS 5,974,572 A * 10/1999 Weinberg et al. ............. 714/47
6,836,786 B1 * 12/2004 Zoller et al. ................. 709/203
7,600,050 B2 * 10/2009 Aritomi ......................... 710/5

* cited by examiner

*Primary Examiner*—David Y Eng
(74) *Attorney, Agent, or Firm*—Thomas, Karceski, Raring & Teague, PC

(57) ABSTRACT

The present invention provides a browser-independent method to inspect the state of any Web Browser from a service that has been invoked synchronously. The remote agent responds to the service request with instructions for the browser to synchronously and recursively invoke another service request with a specific portion of the browser state as the arguments. This allows the browser to continue operating in a synchronous manner, while appearing to behave like a multi-threaded application that is responsive to state inspection requests.

12 Claims, 4 Drawing Sheets

```
function serviceRequest(){
    var synchronous = true;
    var xmlhttp = createXMLHTTPRequestObject();
    if (xmlhttp.readyState==4) {
        eval(xmlhttp. responseText);
    }
    xmlhttp.open("GET", url, synchronous);
}
```

FIG. 2

```
function sendState(variableName){
    var synchronous = true;
    var xmlhttp = // create XMLHTTPRequest object
    if (xmlhttp.readyState==4) {
        eval(xmlhttp. responseText);
    }
    var url = // service call including content of variable
    xmlhttp.open("GET", url, synchronous);
}
```

FIG. 3

INSPECTING WEB BROWSER STATE INFORMATION FROM A SYNCHRONOUSLY-INVOKED SERVICE

BACKGROUND

The present invention relates to debugging a program running in a Web browser.

A web browser is a software application which enables a user to display and interact with text, images, videos, music and other information located on a Web page at a website on the World Wide Web or a local area network. Text and images on a Web page can contain hyperlinks to other Web pages at the same or different website. Web browsers allow a user to quickly and easily access information provided on many Web pages at many websites by traversing these links.

Client-side scripting generally refers to the class of computer programs on the web that are executed client-side, by the user's web browser, instead of server-side (on the web server). This type of computer programming enables web pages to be scripted; that is, to have different and changing content depending on user input or predefined variables (e.g., time of day). A scripting language is a programming language that controls a software application. Scripting languages are nearly always embedded in the application with which they are associated. Web programmers write client-side scripts in languages such as JavaScript and VBScript.

Client-side scripts are often embedded within an HTML document, but they may also be contained in a separate file which is referenced by the document that uses it. Upon request, the necessary files are sent to the user's computer by the web server on which they reside. The user's web browser executes the script and then displays the document, including any visible output from the script. Client-side scripts may also contain instructions for the browser to follow if the user interacts with the document in a predetermined way (e.g., clicks a predetermined button). These instructions can be followed without further communication with the server, though they may require such communication in some circumstances.

To debug a JavaScript program that is running inside a web browser, its execution needs to be controlled and its state inspected. Traditionally, the JavaScript VM (virtual machine) is enhanced with a proprietary debug engine. Such a proprietary debug engine makes it difficult to debug one single program in various browsers, each having their own debug solution. Successful integration to an integrated development environment (IDE) is also made more difficult as a result. Software development and debugging is typically performed using an IDE. An IDE typically comprises a source code editor, a compiler and/or interpreter, build automation tools, and a debugger.

BRIEF SUMMARY

The present invention provides a browser-independent method to inspect the state of any Web Browser from a service that has been invoked synchronously. The remote agent responds with instructions for the browser to synchronously and recursively invoke another service request with a specific portion of the browser state as the arguments. This allows the browser to continue operating in a synchronous manner, while appearing to behave like a multi-threaded application that is responsive to state inspection requests.

In one embodiment of the invention, a method for inspecting web browser state information from a synchronously-invoked service comprises receiving a synchronous service request from a Web browser in which a client-side script is executing; sending a service response in response to the received service request, the service response instructing the Web browser to send a second synchronous service request that includes Web browser state information; receiving the second service request including the requested state information; if additional state information is desired, sending a second service response, the second service response instructing the Web browser to send a third synchronous service request that includes additional Web browser state information; and if additional state information is not desired, sending a second service response, the second service response being empty and thereby releasing the Web browser to continue executing the client-side script.

Code to initiate the first synchronous service request may be inserted into the client-side script at a desired breakpoint. In one embodiment, the client-side script is written in JavaScript and the synchronous service requests are XMLHTTP requests.

In addition to the method for inspecting web browser state information from a synchronously-invoked service, as described above, other aspects of the present invention are directed to corresponding systems and computer program products for inspecting web browser state information from a synchronously-invoked service.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 illustrates an XMLHTTP service request used to initiate the method for inspecting web browser state information from a synchronously-invoked service, in accordance with one embodiment of the present invention;

FIG. 3 illustrates a response from an IDE to request browser state information, in accordance with one embodiment of the present invention;

DETAILED DESCRIPTION

Figure 1:
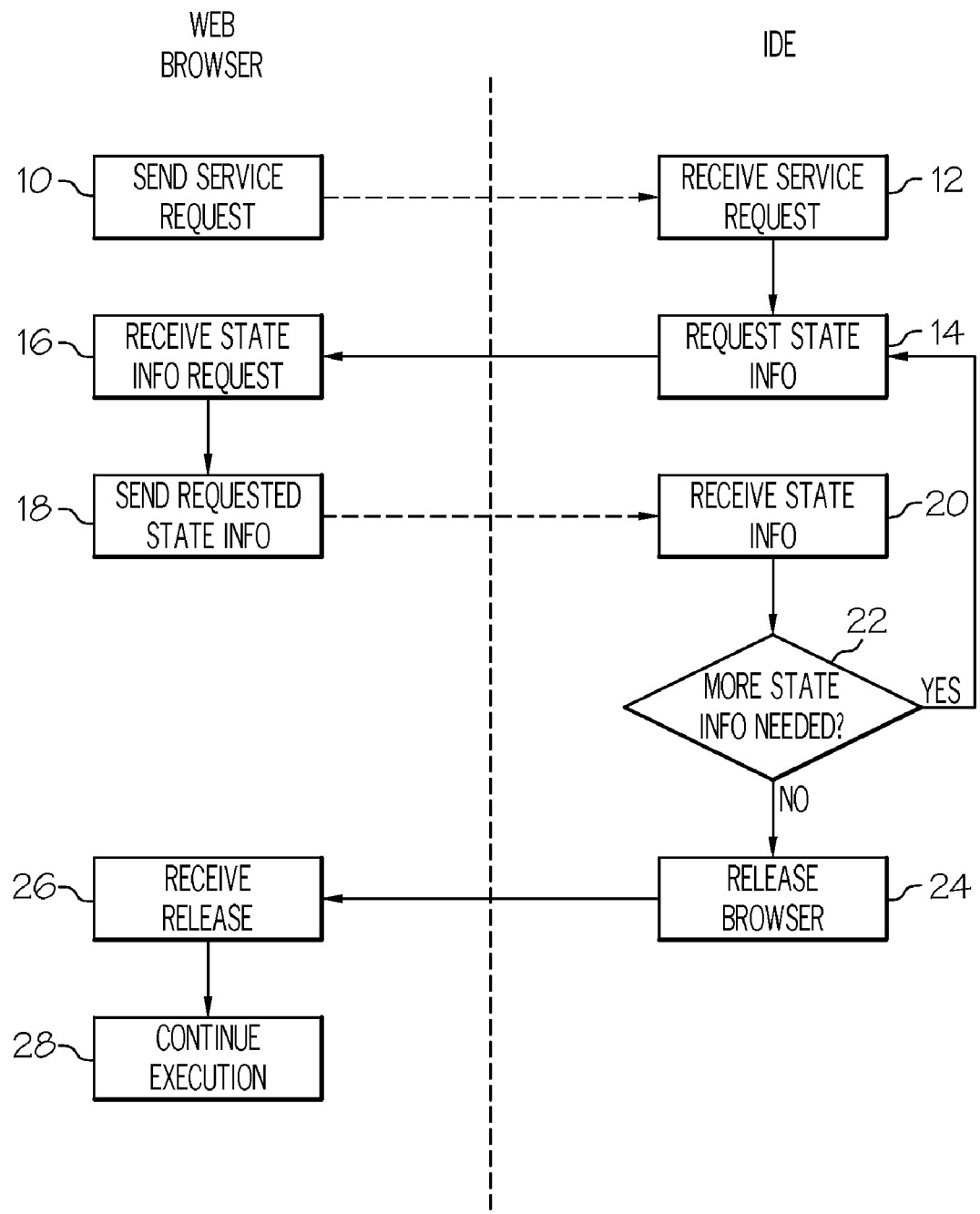
FIG. 1 is a flowchart of the operation of a method for inspecting web browser state information from a synchronously-invoked service, in accordance with one embodiment of the present invention.

While embodiments of the invention will be described herein assuming that the client-side script is written in JavaScript, embodiments of the invention are capable of operating with client-side scripts written in any suitable scripting language. Referring now to FIG. 1, the operation of a method for inspecting web browser state information from a synchronously-invoked service is illustrated in accordance with an embodiment of the present invention. If a client-side script is not working properly and is to be debugged, the script can be modified to insert code into the script at a desired breakpoint. The inserted code will cause the script to send a synchronous service request (block 10) from the browser to a designated recipient (e.g., an IDE) when the breakpoint is reached (the request is indicated to be synchronous in FIG. 1 by use of a dashed line). If the script is written in JavaScript, the synchronous service request may be an XMLHTTP requests. One example of an XMLHTTP service request that may be sent from the browser to the IDE is illustrated in FIG. 2. Because the XMLHTTP is synchronous, the script stops executing until a response is received by the browser. The XMLHTTP service request is received by the IDE (block 12).

In response to the service request, the IDE sends a service response instructing the Web browser to send a second synchronous service request that includes Web browser state information (block 14). The service response is a JavaScript function call (sendState('dataVar')) to send specific state back to the IDE. One example of a service response that may be sent from the IDE to the browser is illustrated in FIG. 3. The requested state information is information that will assist in debugging the script.

When the service response is received by the browser (block 16), the browser will send the requested state information in a second synchronous XMLHTTP service request (block 18). Because the second service request is also synchronous, the script again is prevented from executing further until another response is received from the IDE. When the IDE receives the second service request (block 20), a decision is made (either automatically by the IDE or manually) whether additional state information is needed to debug the script (block 22). If additional state information is determined in block 22 to be needed, the IDE sends another service response instructing the Web browser to send a third synchronous service request that includes additional Web browser state information (block 14).

Blocks 14 through 22 will be recursively executed until it is determined in block 22 that no additional state information is needed. When no additional state information is needed, the IDE sends an empty or "no-op" service response (block 24). When the browser receives the empty service response (block 26), the browser is thereby released to continue executing the client-side script (block 28).

Figure 4:
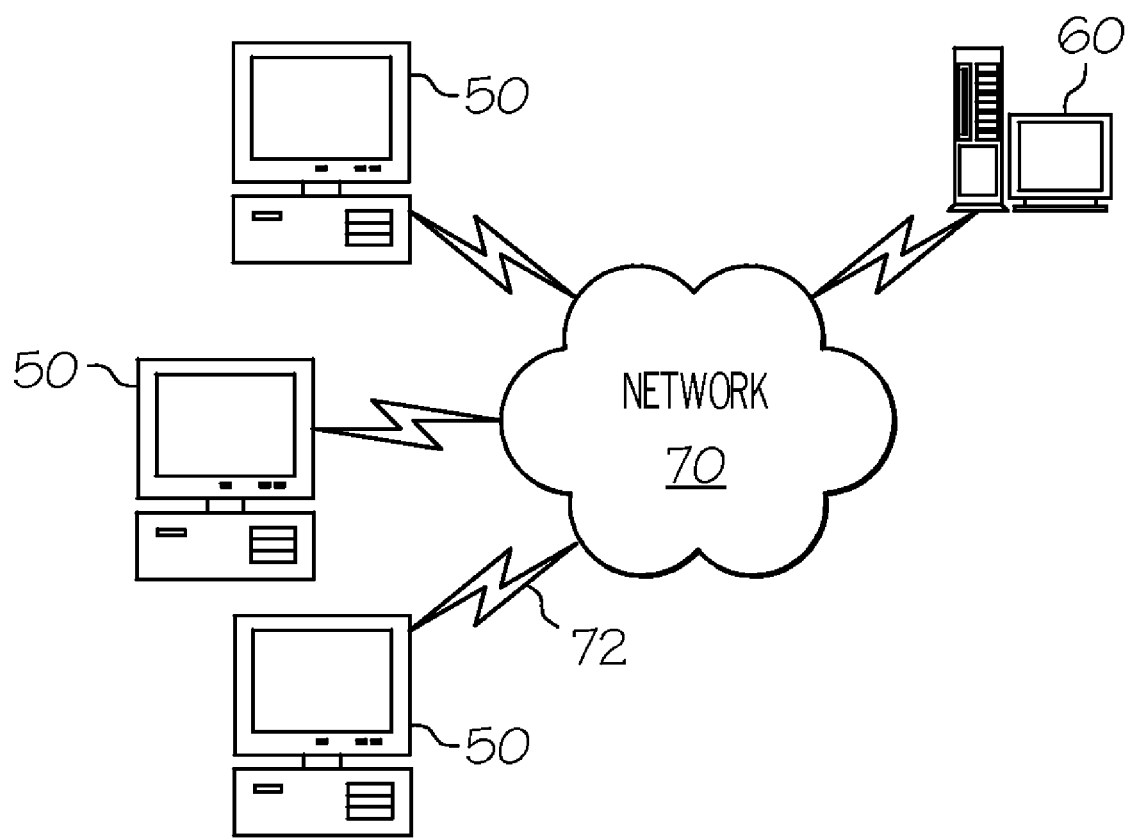
FIG. 4 is a schematic block diagram of a computer network in which embodiments of the present invention may operate.

FIG. 4 is a schematic block diagram of a computer network in which embodiments of the present invention may operate. Computers 50 and server 60 provide processing, storage, and input/output devices executing application programs and the like. Computers 50 may be linked over communication link 72 through communications network 70 to each other and to other computing devices, including server 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. However, computers 50 and server 60 may be linked over any suitable communication network. In the system of FIG. 4, computers 50 are running Web browsers used for accessing and viewing websites, such as may be hosted on server 60. The website hosted on server 60 may include a script (written in, e.g., JavaScript) that may be downloaded to and executed on any of computers 50. Server 60 may execute an IDE on which the client-side script executing on any of computers 50 may be debugged using methods of the present invention.

Figure 5:
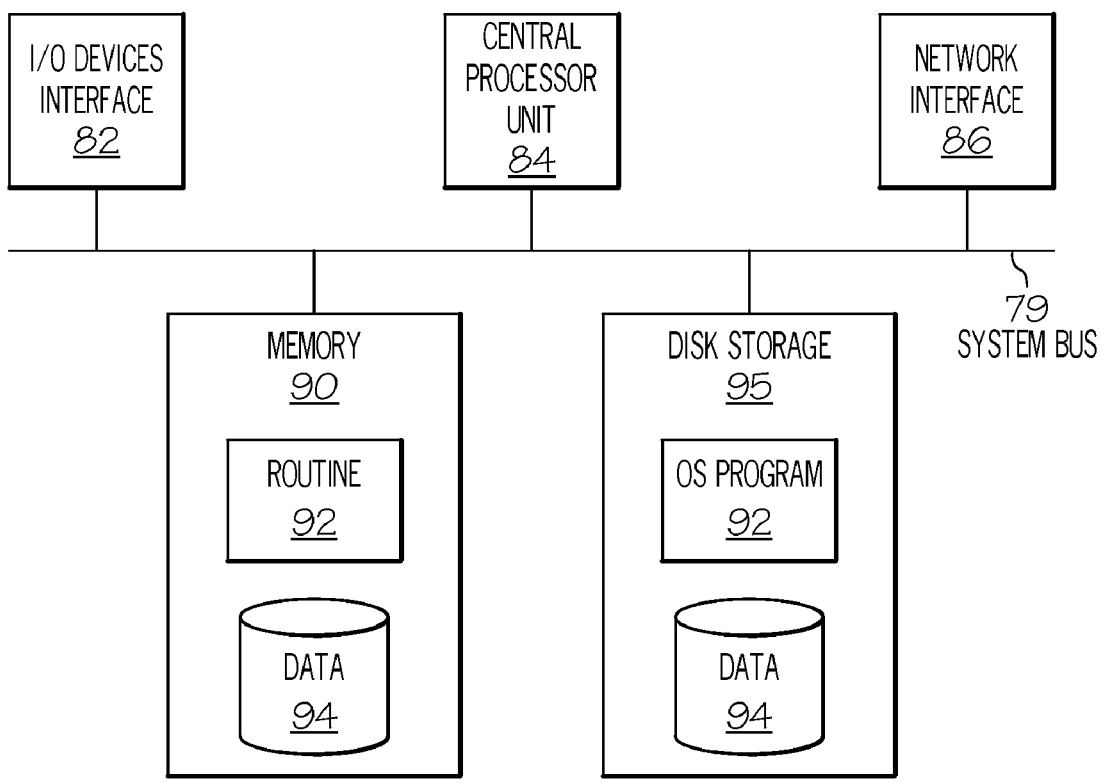
FIG. 5 is a schematic block diagram of a computer in the network of FIG. 4.

FIG. 5 is a diagram of the internal structure of a computer (e.g., computers 72, 74 or servers 76) in the computer network of FIG. 4. Each computer typically contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 4). Memory 90 provides volatile storage for computer software instructions used to implement an embodiment of the present invention. Disk storage 95 provides non-volatile storage for computer software instructions and data used to implement an embodiment of the present invention. Central processor unit 84 is also attached to system bus 79 and provides for the execution of computer instructions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A method comprising:
receiving a synchronous service request from a Web browser in which a client-side script is executing;
sending a service response in response to the received service request, the service response instructing the Web browser to send a second synchronous service request that includes Web browser state information;
receiving the second service request including the requested state information;
if additional state information is desired, sending a second service response, the second service response instructing the Web browser to send a third synchronous service request that includes additional Web browser state information; and
if additional state information is not desired, sending a second service response, the second service response being empty and thereby releasing the Web browser to continue executing the client-side script.

2. The method of claim 1, further comprising:
inserting code for initiating the first synchronous service request into the client-side script at a desired breakpoint.

3. The method of claim 1, wherein the client-side script is written in JavaScript.

4. The method of claim 3, wherein the synchronous service requests are XMLHTTP requests.

5. A system comprising:
a server computer in communication with at least one client computer, the client computer hosting a Web browser in which a client-side script is executing;
wherein the server computer is configured for receiving a synchronous service request from a Web browser in which a client-side script is executing;
wherein the server computer is further configured for sending a service response in response to the received service request, the service response instructing the Web browser to send a second synchronous service request that includes Web browser state information;
wherein the server computer is further configured for receiving the second service request including the requested state information;
wherein the server computer is further configured for if additional state information is desired, sending a second service response, the second service response instructing the Web browser to send a third synchronous service request that includes additional Web browser state information; and
wherein the server computer is further configured for if additional state information is not desired, sending a second service response, the second service response being empty and thereby releasing the Web browser to continue executing the client-side script.

6. The system of claim 5, wherein the server computer is further configured for inserting code for initiating the first synchronous service request into the client-side script at a desired breakpoint.

7. The system of claim 5, wherein the client-side script is written in JavaScript.

8. The system of claim 7, wherein the synchronous service requests are XMLHTTP requests.

9. A computer program product comprising at least one computer-readable storage medium having computer-readable program code stored therein for implementing a process when executed, the computer-readable program code comprising:

computer-usable program code for receiving a synchronous service request from a Web browser in which a client-side script is executing;

computer-usable program code for sending a service response in response to the received service request, the service response instructing the Web browser to send a second synchronous service request that includes Web browser state information;

computer-usable program code for receiving the second service request including the requested state information;

computer-usable program code for, if additional state information is desired, sending a second service response, the second service response instructing the Web browser to send a third synchronous service request that includes additional Web browser state information; and computer-usable program code for, if additional state information is not desired, sending a second service response, the second service response being empty and thereby releasing the Web browser to continue executing the client-side script.

10. The computer program product of claim 9, further comprising:

computer-usable program code for inserting code for initiating the first synchronous service request into the client-side script at a desired breakpoint.

11. The computer program product of claim 9, wherein the client-side script is written in JavaScript.

12. The computer program product of claim 11, wherein the synchronous service requests are XMLHTTP requests.

* * * * *